United States Patent
Matzkovits

[11] Patent Number: 5,867,916
[45] Date of Patent: Feb. 9, 1999

[54] COORDINATE MEASURING MACHINE WITH COLLISION PROTECTION

[75] Inventor: Berthold Matzkovits, Gerstetten, Germany

[73] Assignee: Carl-Zeiss-Stiftung, Heidenheim, Germany

[21] Appl. No.: 893,071

[22] Filed: Jul. 15, 1997

[30] Foreign Application Priority Data

Jul. 31, 1996 [DE] Germany .................. 196 30 823.2

[51] Int. Cl.$^6$ .................................................. G01B 7/03
[52] U.S. Cl. ......................................... 33/503; 33/557
[58] Field of Search ............... 33/503, 556, 557, 33/558, 559, 560, 561; 901/49

[56] References Cited

U.S. PATENT DOCUMENTS

| | | | |
|---|---|---|---|
| 4,177,568 | 12/1979 | Werner et al. | 33/561 |
| 4,288,925 | 9/1981 | McMurtry | 33/561 |
| 4,621,434 | 11/1986 | Hirschmann | 33/503 |
| 4,835,871 | 6/1989 | Pesikov | 33/503 |
| 5,012,591 | 5/1991 | Asakawa | 33/561 |
| 5,056,235 | 10/1991 | Thomas | 33/503 |
| 5,299,361 | 4/1994 | Fiedler | 33/559 |
| 5,327,657 | 7/1994 | Hajdukiewicz et al. | 33/503 |
| 5,435,072 | 7/1995 | Lloyd et al. | 33/559 |

*Primary Examiner*—G. Bradley Bennett

[57] ABSTRACT

A coordinate measuring machine has a measuring arm on which a collision protector is provided that can be deflected transversely of the longitudinal axis of the measuring arm when the measuring sensor system collides with an object. To operate the coordinate measuring machine with different measuring sensor systems and machining units, the coordinate measuring machine includes an identification unit that automatically identifies the measuring sensor system or machining unit. A securing unit is connected to the identification unit and adjusts the torque required to deflect the collision protector in response to identification of the measuring sensor system or machining unit by the identification unit.

14 Claims, 3 Drawing Sheets

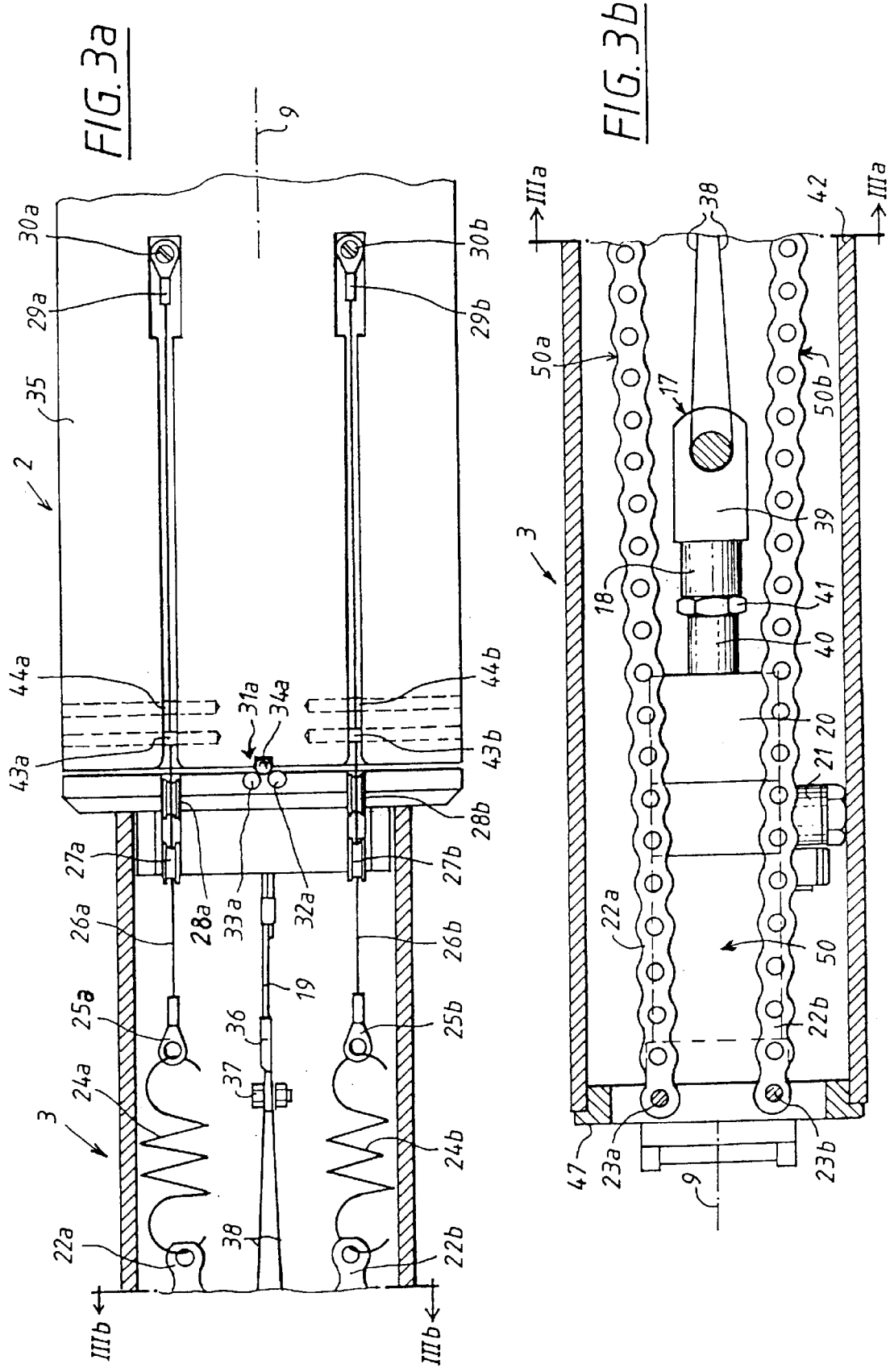

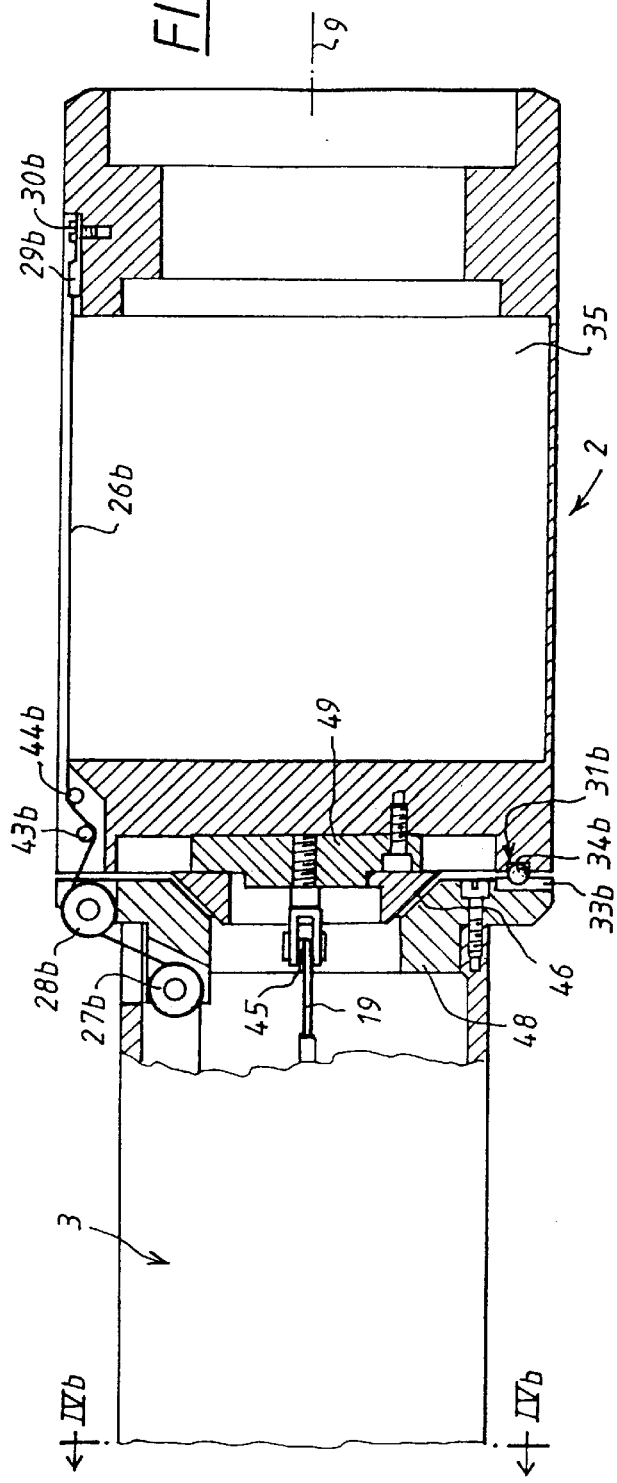
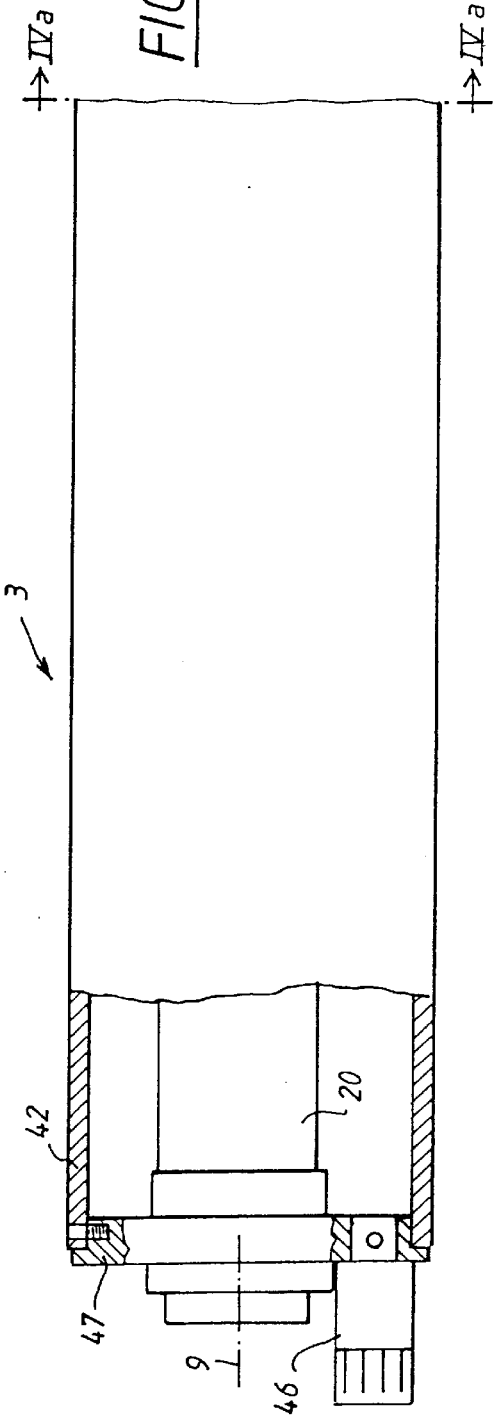

COORDINATE MEASURING MACHINE WITH COLLISION PROTECTION

BACKGROUND OF THE INVENTION

1. Field of the Invention

This invention relates to a coordinate measuring machine for the measurement of workpieces, and more particularly to a coordinate measuring machine with a movable measuring arm that receives at least one interchangeable measuring sensor system; the measuring arm includes a collision protector that is deflectable transversely of the longitudinal axis of the measuring arm when the sensor system collides with an object, and which thereby prevents damage to the sensor system.

2. Discussion of Prior Art

Such coordinate measuring machines have been known in the art for a long time. These measuring machines are usually constructed such that the measuring arm, and thus the measuring sensor system attached to the measuring arm, can be moved in three mutually orthogonal directions, and such that the measurement sensor system has either a mechanical measuring pin or an optical pickup for measuring the workpieces.

Collisions can easily occur due to operating error or deviation of the position of the workpiece to be measured. It is possible that such collisions can damage the measuring sensor system, which is often relatively expensive, or damage can occur to other parts of the coordinate measuring system. As a result, the measuring arm of commercial coordinate measuring machines has been equipped with a collision protector. The collision protector deflected transversely of the longitudinal axis of the measuring arm when the sensor system collided with an object. Additionally, further motion of the coordinate measuring machine was stopped by deflection of the collision protector, preventing damage to the measuring sensor system.

The collision protector of conventional coordinate measuring machines is usually constructed such that the measuring sensor system must meet certain preconditions regarding weight and dimensioning in order to ensure satisfactory operation of the collision protector. However, efforts have been under way to build more flexible coordinate measuring machines that may be used for different tasks. For example, it has been proposed that coordinate measuring machines also be used with milling tools and/or scribing tools for machining. One such application, for example, would be in scribing clay models. In such applications, the measuring sensor system would need to be interchanged with the machining units. Considerably greater torques and forces have to be taken up by the measuring arm to carry-out machining processes. Heretofore, interchanging measuring sensor systems and machining units in coordinate measuring machines with a collision protector of the kind described could only be carried out with large retooling costs or not at all. This was because the collision protector could not accept the torques that can arise with machining units without deflecting.

SUMMARY OF THE INVENTION

The object of the present invention is to provide a coordinate measuring machine with a collision protector that can be operated simply, with different measurement sensor systems and machining units.

This object is achieved by a coordinate measuring machine having a movable arm arranged to receive a measuring sensor system or a machining unit. The measuring arm includes a collision protector that deflects transversely to the longitudinal axis of the measuring arm on collision of the measuring sensor system or the machining unit with an object. In this way, damage to the measuring sensor system or the machining unit is prevented. The coordinate measuring machine also includes an identification unit for automatically identifying the measuring sensor system or the machining unit and a securing unit connected to the identification unit for adjusting the torque required to deflect the collision protector in response to identification of the measuring sensor system or the machining unit by the identification unit.

By this means, different measuring sensor systems or machining units on the measuring arm of the coordinate measuring machine can be detected, and the torque required to deflect the collision protector can be set completely automatically. Thus, the coordinate measuring machine may be easily used for different tasks.

The identification unit tests for identification data present in the measuring sensor system or machining unit. For example, the data may be in an analog or digital format. In the simplest case, the presence or absence of a resistance in the measuring sensor system or machining unit may be tested. The measuring sensor system or machining unit can be identified from the value of the resistance measured, and the identification unit provides a signal to the securing unit to set the torque necessary for deflection.

The securing unit can be embodied in different ways, depending upon the construction of the collision protector. For example, coordinate measuring machines are known in the art in which the collision protector is mounted on the measuring arm in such a manner that the collision protector is held in its normal position by the force of a prestressed spring provided between the collision protector and the measuring arm. For this case, the securing unit can include a pressure unit that variably increases or decreases the prestress of the spring.

In the particularly advantageous embodiment described in more detail below, the collision protector is held in its normal position by tension force between the measuring arm and the collision protector. The exact position of the collision protector is established by three radially arranged bearings. This has the advantage that the collision protector can be deflected to a substantially greater extent than in conventional coordinate measuring machines. For this purpose, the corresponding securing unit includes a tension unit that connects the measuring arm and the collision protector together, and pulls the measuring arm and the collision protector towards each other with a tension force set by the identification unit.

Preferably, the tension unit includes a pneumatic cylinder and a piston rod guided in the pneumatic cylinder. The pneumatic cylinder is connected to the measuring arm, and the piston rod is movably connected to the collision protector, so that the tension force on the collision protector can be reduced or increased depending upon the pressure in the cylinder. Preferably, the pneumatic cylinder is constructed as a so-called double-action cylinder for applying the tension force, and its piston rod can be both pushed into and pulled out of the cylinder. For this purpose, the cylinder is sealed at the output opening for the piston rod and provided with a second compressed air connection.

The tension unit may also be electrical or mechanical. For example, an electric motor connected to the measuring arm can be used, and drives a drum via a worm gear. A cable is wound around the drum at one end and is connected at its other end to the collision protector.

Preferably, the securing unit is fastened to the collision protector in such a manner that the tension force acts approximately symmetrical to the bearing arrangement located between the measuring arm and the collision protector.

When a stand measuring apparatus is the coordinate measuring machine, and the measuring arm is directed horizontally and at least one prestressing unit can be provided to take-up the torque present due to the weight of the collision protector and the measuring sensor system. In the preferred embodiment of the collision protector, which is kept in its normal position by tension force, a second tension unit is provided. The second tension unit is connected to the measuring arm and the collision protector, and pulls the measuring arm and the collision protector towards each other.

The prestressing unit can be arranged such that the transverse force arising due to the weight of the collision protector and of the measuring sensor system can also be taken up.

By taking up the torque and the transverse force, when the measuring sensor system is secured, the force distribution on the three bearings is as symmetrical as possible and acts substantially in the direction of the longitudinal axis of the measuring arm. The advantage of this arrangement is that the torque required to deflect the collision protector over any pair of the three bearings is of equal magnitude for all three pairs of bearings. Moreover, the torque required to deflect the collision protector can be minimized for each of the possible deflection directions. In addition, the torque required to deflect the collision protector can be minimized so that the collision protector can be deflected at relatively small torques to protect the sensitive measuring sensor system. Further, it is only necessary to use the securing unit when a machining unit is attached to the measuring arm.

DESCRIPTION OF THE DRAWINGS

Preferred embodiments of the invention will now be described, taken together with the accompanying drawings, in which:

FIGS. 3a and 3b is a top view of a collision protector according to the invention.

FIGS. 4a and 4b is a side view of the collision protector according to FIGS. 3a and 3b.

DETAILED DESCRIPTION OF A PREFERRED EMBODIMENT

Figure 1:
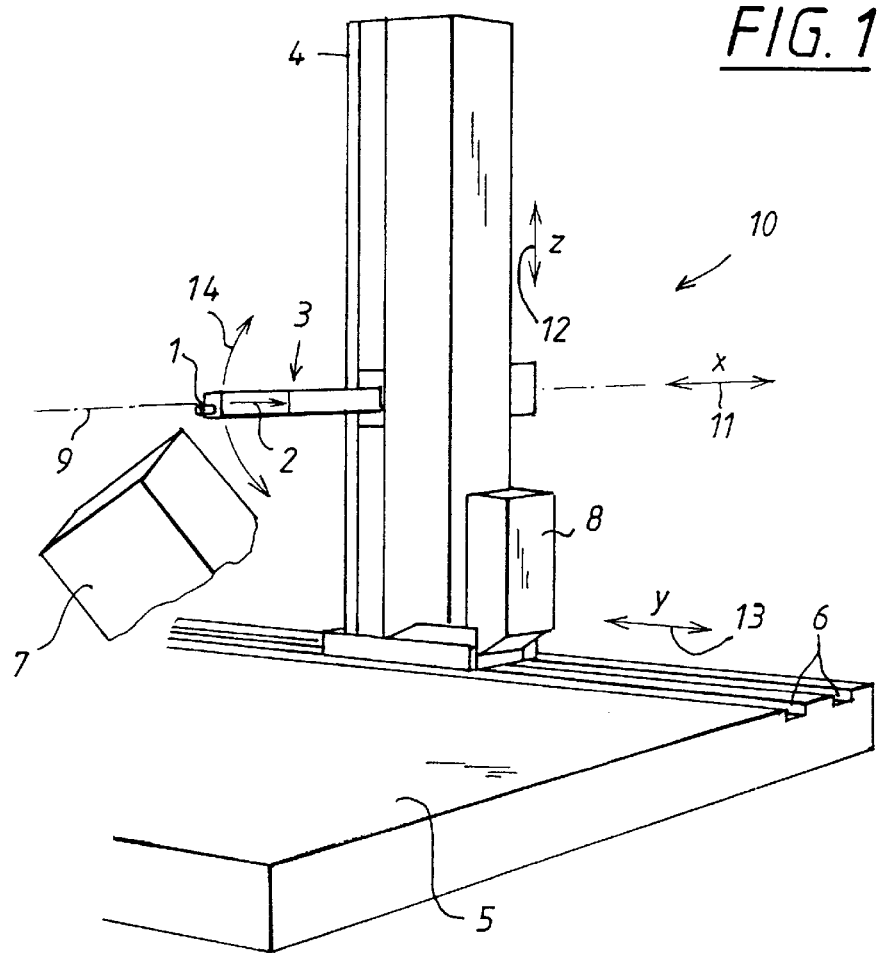
FIG. 1 shows a coordinate measuring machine with a collision protector according to the invention.

FIG. 1 shows an advantageous coordinate measuring machine for the measurement of workpieces (7) according to the invention. The coordinate measuring machine (10) is constructed as a so-called stand structure, and has a movable measuring arm (3). The measuring arm is mounted by means of a suitable slide in the stand (4), such that the measuring arm can travel both horizontally according to the arrow (11) and vertically according to the arrow (12). The stand (4) is movable in tracks (6) of the machine bed (5), in the direction of motion shown by the arrow (13), laterally of the workpiece (7) to be measured. The measuring arm (3) receives an interchangeable measuring sensor system (1), which is usually attached to the measuring arm (3) by means of a change-over holder, known in the art and is not shown here in more detail. Additionally, in the region of the measuring sensor system (1), the measuring arm includes a collision protector (2). The collision protector (2) can be deflected transversely of the longitudinal axis (9) of the measuring arm (3) when the measuring sensor system (1) collides with an object, thereby preventing damage to the measuring sensor system. For example, if the measuring arm (3) in the coordinate measuring machine is lowered until the measuring arm (3) rests on the workpiece (7), the collision protector (2) simply bends upward in the direction of the arrow (14), and thereby prevents the destruction of the measuring sensor system (1).

As mentioned, in addition to being suitable for receiving the measuring sensor system (1), the coordinate measuring machine (10) shown in FIG. 1, is also suitable for receiving machining units (not shown in further detail here) such as a milling tool or a scribing tool. However, this leads to the following problem regarding the collision protector (2). On the one hand, the measuring sensor system (1) is often so sensitive that even a collision involving small forces is sufficient to destroy the measuring sensor system (1). Therefore, the torque required to deflect the collision protector (2) must be small. On the other hand, higher torques are required for machining the workpiece (7) with machining units such as a scribing tool or a milling tool. In this case, the collision protector (2) must be constructed such that the torque required to deflect the collision protector (2) is relatively high.

Figure 2:
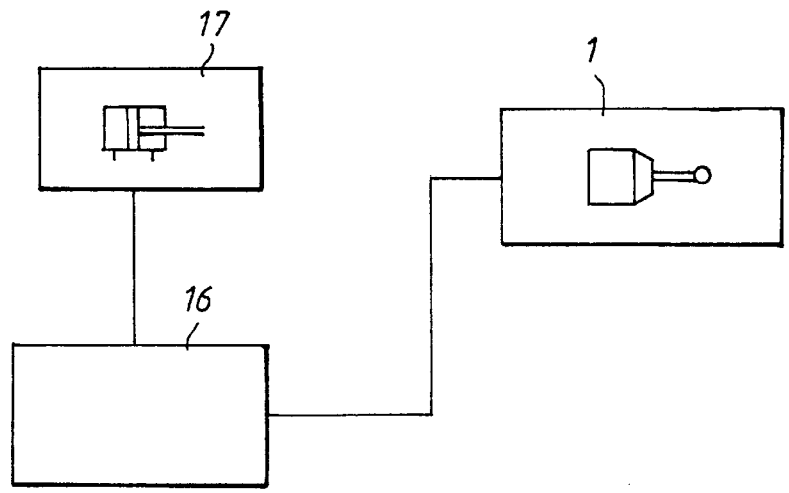
FIG. 2 is a schematic block diagram of the identification unit and the securing unit.

In order to use the coordinate measuring machine shown in FIG. 1 in a simple manner with both the measuring sensor system (1) and the machining unit, an identification unit (16) is provided to automatically identify the measuring sensor system (1) or the machining unit. Furthermore, a securing unit (17) is provided to adjust the torque required to deflect the collision protector (2) in response to identification of the measuring sensor system or the machining unit. FIG. 2 shows this arrangement in a simple block diagram.

The identification unit (16) can be arranged at different places in the coordinate measuring machine, and can be constituted differently. For example, the identification unit (16) can be constituted as firmware, provided either in the stand (4) or in the measuring arm (3). The identification unit (16) can also be arranged in a central computer (not shown) of the coordinate measuring machine.

Identification in the identification unit (16) takes place by testing analog or digital identification data present in the measuring sensor system (1) or machining unit. In this instance, the identification unit (16) tests the presence of a resistance value. Hence, different test arrangements are possible. In a particularly simple version, the test only determines whether a measuring sensor system (1) or a machining unit is present. For this purpose, the measuring sensor systems have two connections that can be contacted by the identification unit (16) and are conductively connected together. The corresponding connections of the machining units are not conductively connected together. To test for whether a measuring sensor system (1) or a machining unit is present, it is only necessary to test whether or not there is a conductive connection between the two points.

The identification may be further diversified, in that different resistance values are associated with the conductive connections between the connecting points of different measuring sensor systems (1) and machining units, and the measuring sensor system (1) or the machining unit is identified by the identification unit (16), based on the resistance value.

The identification unit (16) can also be arranged such that it tests the presence of digital data in the measuring sensor system or machining unit. For example, a semiconductor memory in the measuring sensor system or the machining unit can provide digital data in any manner that identifies the measuring sensor system (1) or the machining unit.

For the sake of clarity the above described electronic components are not shown in FIGS. 3a, 3b, 4a, 4b, which show in more detail the measuring arm (3) and the collision protector (2). The electrical connections between the identification unit (16) and the measuring sensor system (1) or the machining unit can be realized as described above by a conductive connection or alternatively by a capacitive connection. The measuring arm (3), the collision protector (2) and the measuring sensor system (1) or the machining unit are provided with corresponding contacts that are closed when the measuring sensor system (1) or the machining unit are mounted on the collision protector (2) and the collision protector (2) is in its normal position on the measuring arm (3).

Instead of said contacts, one can use a contactless connection between the identification unit (16) and the measuring sensor system (1) or a connection via an electric cable that is guided outside the collision protector (2) and the measuring arm (3).

The securing unit (17) will now be described in greater detail in connection with FIGS. 3a and 3b, and FIGS. 4a and 4b. FIGS. 3a and 3b show partially in section an enlarged view of the measuring arm (3) with the collision protector (2) of FIG. 1 integrated therein. The securing unit (17) includes a tension unit (50), that connects the measuring arm (3) and the collision protector (2) and pulls the collision protector (2) and the measuring arm (3) toward each other with a tension force established by the identification unit (16). For this purpose, the tension unit (50) has a pneumatic cylinder (20) in which a piston rod (40) is movably guided. The pneumatic cylinder (20) is preferably embodied as a so-called double-action cylinder (20) to apply the tension force. The piston rod (40) can be either pushed out of the cylinder or pulled into the cylinder. The cylinder (20) is sealed for this purpose at the output opening for the piston rod (40), and is provided with a second compressed air connection (21). The first compressed air connection is not shown here, since it is not necessary to show it.

The pneumatic cylinder (20) is connected to a back portion (47) of the measuring arm (3). The piston rod has a thread at its end, onto which a fork (39) is screwed. The fork (39) is connected to a steel cable (38). At the other end of the steel cable (38), a further steel cable (19) is connected by an eyelet (36) and is attached to a fork (45). The fork (45) is fixedly connected to the housing (35) of the collision protector (2) via the part (49). The connection between the securing device (17) and the collision protector (2) is constructed such that the tension force acts approximately symmetrically on the bearings (31a, 31b, 31c—31c not shown), which are located between the measuring arm (3) and the collision protector (2). This is achieved by the fork (45) being attached to the collision protector (2) midway between the bearings (31a, 31b, 31c), and thus in the region of the longitudinal axis (9) of the measuring arm (3).

The torque required to deflect the collision protector (:2) is changed by acting on the pneumatic cylinder (20) with compressed air via the compressed air connection (21), under the control of the identification unit (16). The collision protector (2) and the measuring arm (3) are thus pulled together more strongly, so that the torque required to deflect the collision protector (2) is increased. The fact that the securing unit (17) acts in the region of the longitudinal axis (9) makes it possible for the tension force to be uniformly distributed to the three bearings (31a, 31b, 31c).

The securing unit (17) described in this manner can be used both in measuring arms as shown in FIG. 1 and also for the measuring arms of so-called portal measuring machines, in which a portal bridges over the workpiece to be measured and the corresponding measuring arm is suspended vertically on the portion of the portal which bridges over the workpiece to be measured.

The collision protector (2) integrated into the measuring arm (3) is completely free to move on the measuring arm (3) and is kept in its position only by tension force. For exact fixing of the collision protector (2) in a defined position, the collision protector (2) is mounted by three radially arranged bearings (31a, 31b, 31c) on the closure plate (48) of the measuring arm (3). In FIG. 3a, only the bearing (31a) arranged in the upper region, and in FIG. 4a only the bearing (31b) in the lower region, are visible. Only the upper bearing (31a) will be described by way of example. Bearing (31a) consists of two mutually parallel adjacent rollers (32a, 33a) that are mounted in the closure plate of the measuring arm (3), and a ball (34a) that cooperates with the mutually parallel adjacent rollers (32a, 33a) and is anchored in the housing (35) of the collision protector (2). The ball (34a) rests on the two rollers (32a, 33a). The two rollers (32a, 33a) can also be arranged in the collision protector (2), and the ball (34a) in the measuring arm (3). Since the collision protector is mounted on the measuring arm (3) by means of three radially arranged bearings (31a, 31b, 31c), the exact mounting position of the collision protector (2) is unambiguously defined, so that the collision protector (2) can return reproducibly to its original position after a deflection due to a collision.

The bearings (31a, 31b, 31c) can be constructed in other ways. For example, to have two adjacently arranged balls and a roller that rests on both balls and cooperates with the balls.

To improve the return of the collision protector (2) into its normal position after a deflection, a conical part (46) is attached to the housing (35) of the collision protector (2) and cooperates with the closure plate (48) of the measuring arm (3). After deflection, the collision protector (2) is conducted back to about its original position, which is finally established by the three radially arranged bearings (31a, 31b, 31c).

An electric voltage is present at the rollers (32a, 32b, 32c) and the rollers (33a, 33b, 33c) and is bridged over by the balls (34a, 34b, 34c). When the collision protector (2) is deflected with respect to the measuring arm (3), the balls (34a, 34b, 34c) lift from the rollers (33a, 33b, 33c) at least one of the bearings (31a, 31b, 31c), and the circuit, which is normally closed, is thereby opened. This interruption of the circuit can be sensed by a corresponding circuit in the coordinate measuring machine (10) and leads to an immediate standstill of the coordinate measuring machine. In addition, the corresponding circuit causes tension unit (50) to relax, so that the tension unit (50) no longer exerts tension force on the collision protector (2). This reduces the torque required for further deflection of the collision protector (2). Hence, destruction of the machining unit is avoided. The relaxation can be effected by opening a valve provided for this purpose, so that the pressure in the pneumatic cylinder immediately escapes.

In a rather cost-effective solution, two key switches (not shown in detail here) are provided in the collision protector (2), with their key surfaces normally resting on the measuring arm (3), so that the key switches are in the keyed state. A circuit is thereby closed, which runs via both key switches. As soon as the collision protector (2) deflects, one of the key switches opens, so that the circuit is interrupted, leading to an immediate standstill of the coordinate measuring machine and to relaxation of the tension unit (50) in the securing unit (17).

In this case, which concerns a stand measuring machine in which the measuring arm (3) of the coordinate measuring machine (10) is horizontally directed, two additional prestressing units (50a, 50b) are provided that take up the torque arising due to the weight of the collision protector (2) and the measuring sensor system (1) or the machining unit. The prestressing units (50a, 50b) also include tension units (24a, 24b), which are provided in a very simple manner in the form of springs. One end of the tension units (24a, 24b), or springs, is connected to a perforated strip (22a, 22b) that can be fastened in different positions on the pins (23a, 23b). The other end of the tension units (24a, 24b) is connected by means of steel cables (26a, 26b) to the housing (35) of the collision protector (2). In order to connect the steel cables (26a, 26b) to the tension units (24a, 24b) and to the collision protector (2), a respective eyelet (25a, 25b) and (29a, 29b) is fastened to the ends of the steel cables (26a, 26b), the eyelets (29a, 29b) are screwed with respective screws (30a, 30b) into the collision protector (2). In order to take up the torque, the tension units (24a, 24b) or springs are stressed by means of the perforated strip (22a, 22b) until the torque arising due to the weight of the collision protector (2) and the measuring sensor system (1) has been completely taken up.

For simpler operation, the prestressing units (50a, 50b) can be arranged by shortening the perforated strips (22a, 22b) by a few hole spacings and connecting the perforated strips at their ends to a chain. Instead of the pins (23a, 23b), a central pin can be provided for fastening the chain.

A tensioning unit that connects the measuring arm (3) and the collision protector (2) is thus provided in the prestressing unit (50a, 50b), and pulls the measuring arm (3) with an adjustable tension force. As is shown in FIG. 4a, the steel cables (26a, 26b) are deflected via two deflecting rollers (27a, 27b) attached to the measuring arm (3), and in the collision protector (2) via two deflecting pins (43a, 43b and 44a, 44b) fastened therein, such that the tension force of the cables acts on the collision protector (2) in the upper region of the collision protector (2).

In addition, the cables (26a, 26b) of the prestressing units are fed by the deflecting rollers (28a, 28b) and the deflecting pins (43a, 43b) in such a manner that the transverse force arising due to the weight of the collision protector (2) and the measuring sensor system (1) is also taken up, because the cables (26a, 26b) act on the collision protector (2) with a force not only parallel to the longitudinal axis (9) but also with a force component perpendicular to the longitudinal axis (9). Because the rollers (28a, 28b) are higher than the deflecting pins (43a, 43b), the resulting tension forces on the collision protector (2) are directed both parallel to the longitudinal axis (9) of the measuring arm and also upward, perpendicularly to the longitudinal axis (9).

By the taking up of the torque and transverse force arising due to the weight of the collision protector (2) and the measuring sensor system (1), with the measuring sensor system (1) secured, the force distribution on the three bearings (31a, 31b, 31c) is as symmetrical as possible and acts substantially in the direction of the longitudinal axis of the measuring arm (3). This has the advantage that the torque required to deflect the collision protector(2) over any pair of the three bearings (31a, 31b, 31c) is of equal magnitude for all three pairs. Furthermore, the torque required for deflecting the collision protector (2) can be minimized for each of the possible directions of deflection, so that the collision protector (2) is deflected at relatively small torques, in order to protect the sensitive measuring sensor system (1). Furthermore, it is not necessary to use the securing unit (17), which only needs to be brought into action when a machining unit is set in place.

Depending on the connection of the tension units with the collision protector (2) by means of cables (19, 26a, 26b), the collision protector (2) can be very widely deflected, since the cables (19, 26a, 26b) are flexible, and can be bent during a deflection of the collision protector (2).

It is clear that the invention is not limited to the embodiments described here. Rather, the invention is to be taken together with all equivalent coordinate measuring machines in which the principle according to the invention is used in a modified form.

I claim:

1. A coordinate measuring machine for measurement of workpieces (7), comprising:

a movable measuring arm (3) arranged to receive a measuring sensor system or a machining unit, said measuring arm (3) including a collision protector (2) that deflects transversely to a longitudinal axis (9) of said measuring arm (3) on collision of said measuring sensor system or machining unit with an object to prevent damage to said measuring sensor system or said machining unit, an identification unit (16) for automatically identifying said measuring sensor system or said machining unit, and a securing unit (17) connected to said identification unit (16) for adjusting torque required to deflect said collision protector in response to identification of said measuring sensor system or machining unit by said identification unit (16).

2. The coordinate measuring machine according to claim 1, wherein said securing unit (17) comprises a first tension unit (50) that connects and pulls said measuring arm (3) and said collision protector (2) together with a tension force established by said identification unit (16).

3. The coordinate measuring machine according to claim 2, wherein said first tension unit (50) comprises a pneumatic cylinder (20) and a piston rod (40) movably guided in said pneumatic cylinder (20).

4. The coordinate measuring machine according to claim 2, further comprising a bearing arrangement (31a, 31b, 31c) located between said measuring arm (3) and said collision protector (2), wherein said first tension unit (50) is connected to said collision protector in a manner such that said tension force acts about symmetrically on said bearing arrangement (31a, 31b, 31c).

5. The coordinate measuring machine according to claim 1, wherein said measuring arm (3) is aligned horizontally.

6. The coordinate measuring machine according to claim 5, further comprising at least one prestressing unit (50a, 50b) for taking up torque arising due to weight of said collision protector (2) and said measuring sensor system or said machine unit.

7. The coordinate measuring machine according to claim 6, wherein said prestressing unit (50a, 50b) takes up transverse force arising due to weight of said collision protector and said measuring sensor system or said machine unit.

8. The coordinate measuring machine according to claim 6, wherein said prestressing unit (5a, 50b) comprises a second tension unit (24a, 24b) connected for pulling together said measuring arm (3) and said collision protector (2) with an adjustable tension force.

9. The coordinate measuring machine according to claim 8, wherein said adjustable tension force acts on said collision protector (2) in an upper region of said collision protector (2).

10. The coordinate measuring machine according to claim 1, wherein said identification unit (16) is arranged to test identification data present in said measuring sensor system or said machining unit.

11. The coordinate measuring machine according to claim 10, wherein said identification data comprises at least one resistance value.

12. The coordinate measuring machine according to claim 8, further comprising cables (19, 26a, 26b) for connecting said first tension unit (50) and said second tension unit (24a, 24b) to said collision protector (2).

13. The coordinate measuring machine according to claim 1, further comprising three radially arranged bearings (31a, 31b, 31c) for mounting said collision protector (2) to said measuring arm (3) in an unambiguously defined position with respect to said measuring arm (3).

14. The coordinate measuring machine according to claim 2, wherein said first tension unit (50) is arranged to relax upon deflection of said collision protector (2) so that said first tension unit (50) ceases to exert said tension force on said collision protector (2).

* * * * *